United States Patent
Hamed et al.

(10) Patent No.: US 8,610,567 B2
(45) Date of Patent: Dec. 17, 2013

(54) SYSTEM AND METHOD FOR AIRBAG DEPLOYMENT DETECTION

(75) Inventors: Siri Hamed, Westland, MI (US); Bill Johnson, Royal Oak, MI (US); Tara Thweny, Commerce Township, MI (US); Karen Skalny, Shelby Township, MI (US); Syed Nabi, Troy, MI (US); Shafer Seymour, Bartlett, IL (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 314 days.

(21) Appl. No.: 13/100,821

(22) Filed: May 4, 2011

(65) Prior Publication Data
US 2012/0282885 A1    Nov. 8, 2012

(51) Int. Cl.
 *G08B 21/00* (2006.01)
(52) U.S. Cl.
 USPC .................. 340/540; 340/425.5; 340/436
(58) Field of Classification Search
 USPC ............................................... 340/540
 See application file for complete search history.

(56) References Cited

U.S. PATENT DOCUMENTS

| | | | |
|---|---|---|---|
| 6,293,584 B1 | 9/2001 | Levine | |
| 7,574,195 B2 * | 8/2009 | Krasner et al. | 455/404.2 |
| 8,417,210 B2 * | 4/2013 | Tomer | 455/404.1 |
| 2001/0013696 A1 * | 8/2001 | Davis et al. | 280/735 |
| 2009/0085873 A1 | 4/2009 | Betts et al. | |
| 2010/0227582 A1 | 9/2010 | Berry et al. | |

FOREIGN PATENT DOCUMENTS

DE    102005018234 B3 *    11/2006

OTHER PUBLICATIONS

International Search Report and Written Opinion dated Jun. 26, 2012, from corresponding International Patent Application No. PCT/US2012/031932.

* cited by examiner

*Primary Examiner* — Kerri McNally

(57) ABSTRACT

A system and method for airbag deployment sensing with a mobile device is provided. The system senses an effluent indicative of airbag deployment with a chemical sensor and determines if an airbag deployment condition exists based on the sensing of the chemical sensor. The system may then initiate an emergency communication if it is determined that the airbag deployment condition exists.

21 Claims, 3 Drawing Sheets

SYSTEM AND METHOD FOR AIRBAG DEPLOYMENT DETECTION

BACKGROUND

1. Field of the Invention

The present invention generally relates to a system and method for the detection of airbag deployment.

2. Description of Related Art

Many vehicles have a telematics system that will send an emergency notification in a crash situation. These systems typically receive an electronic signal from the airbag controller indicating if the airbag has been deployed. For systems that are built into a vehicle, an electronic notification from the airbag controller can be a simple and reliable way to determine whether the airbag has been deployed. However, many other vehicles do not include an integrated telematics system. For example, the driver may desire to add a crash notification device after the vehicle is purchased. In this scenario, trying to wire the device to the airbag controller in the aftermarket may be costly, unreliable, and may void the system warranty. In view of the above, it is apparent that there exists a need for an improved system for the detection of airbag deployment.

SUMMARY

A system and method for airbag deployment sensing with a mobile device is provided. The system senses an effluent indicative of airbag deployment with a chemical sensor and determines if an airbag deployment condition exists based on the sensing of the chemical sensor. The system may then initiate an emergency communication if it is determined that the airbag deployment condition exists.

The system may be smart sensor integrated device that senses/detects gas or chemical residue released by a deployed airbag. Upon confirmation of airbag deployment by gas or chemical residue, the device may notify emergency services, for example 911 services in the USA, of a probable vehicle accident. The device may be integrated into any cellular phone, global positioning system (GPS), or stand-alone telematics device. Emergency services can work with cellular service provider to identify location of the device or origin of the emergency service call, additionally any GPS enabled device can provide exact location information to emergency services provider.

According to this implementation, the detection system is independent of any on-vehicle collision detection systems available today from automotive OEMs. The alert system is also different from any other in-vehicle alert system (e.g. GM's OnStar, BMW ASSIST, Ford's Sync, Mercedes mbrace etc.), as it is completely independent of the OEM system. The device may have its own detection system and may be integrated with a cellular NAD to enable direct communication with emergency services. All other vehicle collision or airbag deployment alert systems are integrated within the vehicle function and part of the vehicle architecture.

This airbag deployment detection by detecting effluents alert system is not integrated with any vehicular system, thus it remains completely independent and may be moved from vehicle to vehicle. As this system is not required to communicate with different car OEM's airbag systems, or any other vehicular system or architecture, any devices equipped with this effluent detector could work with any vehicle make, model, and year that are equipped with airbags.

Further objects, features and advantages of this application will become readily apparent to persons skilled in the art after a review of the following description, with reference to the drawings and claims that are appended to and form a part of this specification.

DETAILED DESCRIPTION

Figure 1:
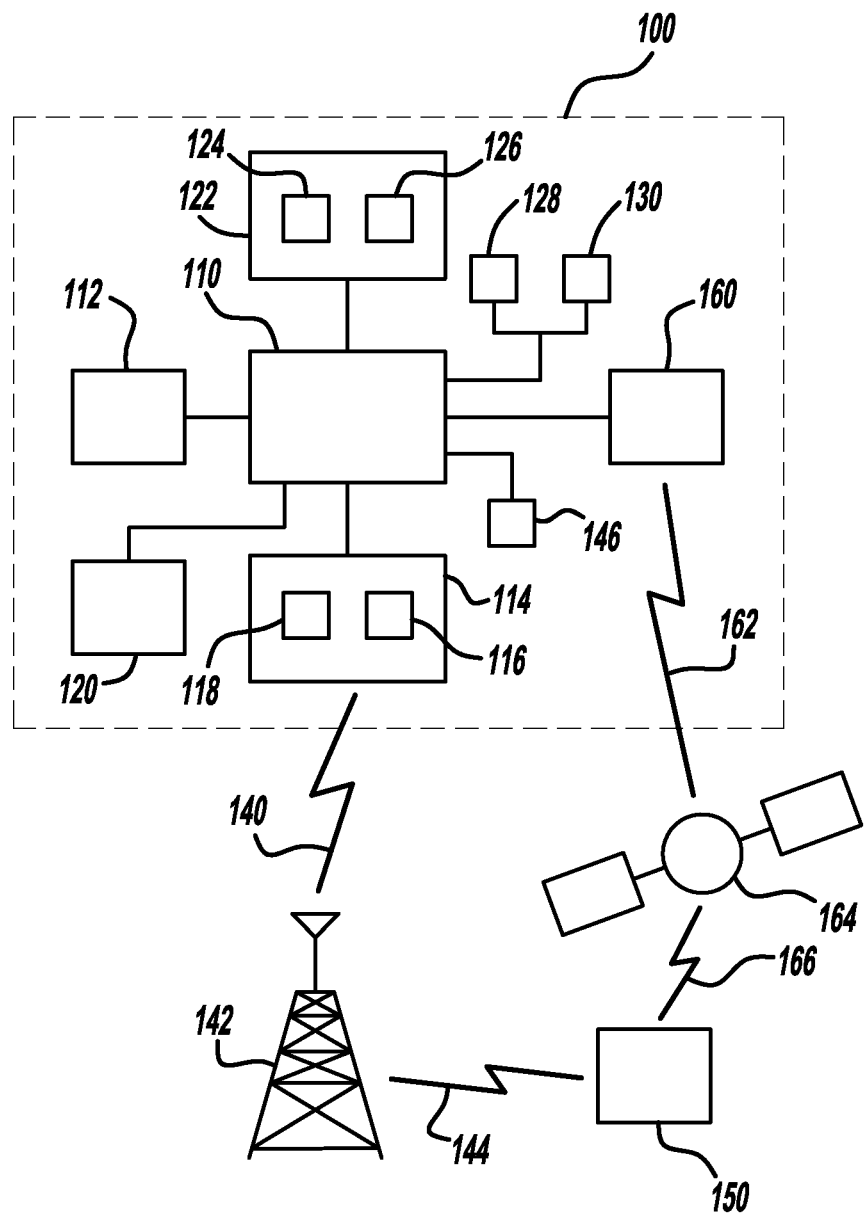
FIG. 1 is a schematic view of a mobile device for sensing airbag deployment.

Now referring to FIG. 1, a mobile device 100 with airbag deployment sensing capability is provided. The mobile device 100 may be a cell phone, a portable GPS unit, or similar device. The mobile device 100 includes a processor 110, a chemical sensor 112, and a transceiver 114. A processor 110 may be a microprocessor, although other processors may be used for example, an application specific integrated circuit (ASIC), a field programmable gate array (FPGA), or similar device. The processor 110 may be in communication with storage 120. The storage 120 may include memory such as random access memory, read only memory, static memory, or other memory devices, or any other storage device such as a magnetic hard drive, optical drive, or other storage mechanism. The processor 110 is also in communication with a chemical sensor 112. The chemical sensor 112 may be a chemical or airborne particle analysis chip. As such, the sensor is able to detect to gas or chemical residue released by an airbag during activation. The chemicals released during airbag activation are typically known as effluents. The sensor 112 may be able to detect the presence one or more effluents, as well as, the concentration of one or more effluents in the air around the device. In addition, a portion of the sensor 112 may be exposed through an opening in the housing of the mobile device 100. Sensor 112 may detect one or more of the following effluents sodium azide, nitroguanidine, ammonium nitrate ($NH_4NO_3$), dicyanamide or dicyanamide salts, sodium borohydride ($NaBH_4$), sodium hydroxide, cornstarch, French chalk, and talcum powder. However, it is also understood that a plurality of sensors may be used in combination to detect different effluents or combinations of effluents.

The chemical sensor may take the form of a chemical and airborne particle analysis chip contained within a device that is capable of initiating a phone call. The chip could be easily located in a cell phone or a stand-alone telematics device that contains a network access device (NAD), which may be a cellular radio. The sensor may be configured to detect the gas or chemical residue released by airbag activation. If airbag effluents are detected, the device may automatically contact emergency services (e.g. 911 in USA) to alert emergency personnel. When available, additional or optional commands can activate a speaker phone option. This provides the user the opportunity to communicate with emergency service operators even if the phone is not readily accessible. Further, GPS enabled devices can send exact location information as well.

Airbag technology has evolved over the years and, as a result, the chemical composition of the effluents has changed. Early airbags used a fairly substantial quantity of sodium azide, a toxic chemical, to generate the nitrogen that fills the bag. However, a multi-step chemical reaction consumed nearly all of this chemical, thus preventing a harmful release into the cabin. Nonetheless, small quantities did escape, providing a useful chemical signature. Newer propellants include nitroguanidine, phase-stabilized ammonium nitrate (NH4NO3), dicyanamide or its salts, and sodium borohydride (NaBH4). Post-inflation, older reactions introduced small quantities of sodium hydroxide into the vehicle, which may serve as another potential marker. In all cases the principle effluent is dust. Most of this dust consists of cornstarch, French chalk, or talcum powder, which are used to lubricate the airbag during deployment.

In addition, airborne trace-gas and particulate detection systems are constantly improving. Single-chip chemical analysis products are also becoming available. For example: some scientists are at are working on microscopically manufactured surfaces that respond in predictable ways when exposed to certain gas molecules. These microchip-size sensors can detect extremely minute traces of gas within minutes, or even within seconds of exposure. While airborne particle counting technology is a bit more problematic than chemical analysis, there are a number of hand-held device that can accomplish this task. For example, some portable instruments detect and count ultrafine particles (smaller than 1 micrometer) that often accompany or signal the presence of a pollutant.

The exact nature of the chemical sensor may depend on the prevalent inflation technology. As such, multiple chemical signature detection profiles may be required in order to deal with the differing airbag chemistries found in different model-year cars.

The chemical sensor 112 or processor 110 may be configured to detect a combination of two or more effluents indicative of the airbag deployment. In one implementation, the chemical sensor or processor identify the airbag deployment based on a weighted combination of a plurality of effluents. For example, a scalar value may be multiplied by the concentration of each effluent and if the addition of the product of each effluent and its corresponding scalar results in a score above a predetermined threshold score, then the processor 110 may determine that an airbag deployment condition exists. Further, it is understood that the processor 110 may be in communication with a plurality of chemical sensors with either each chemical sensor sensing for different effluents, or for using each chemical sensor as a reliability indicator of the other chemical sensors.

The processor 110 may also be used in communication with a user interface 122. The user interface 122 may include a display 124 and controls 126, such as buttons, track balls, touch interfaces, as well as other known controls for receiving input from a mobile device. The processor 110 may be in communication with a speaker 128 and a microphone 130 for conducting audio communications functions by the mobile phone. The processor 110 may also be in communication with transceiver 114. The transceiver 114 may include a transmitter 118 and a receiver 116, although it is understood that separate a transmitter and receiver could be used. The transceiver 114 is in communication with a radio tower 142, as denoted by line 140. In a cellular phone application, the communication 140 may take the form of a wireless protocol such as a standard cellular network protocol such as Advanced Mobile Phone Service (AMPS), Global System for Mobile Communications (GSM), Time Division Multiple Access (TDMA), Code Division Multiple Access (CDMA), and the like. To transmit data in the cellular environment, different types of standard bearer services exist including, but not limited to, general packet radio service (GPRS), short message service (SMS), circuit switched data service (CSD), and high-speed circuit switched data service (HSCSD). Further, standard transmission control protocol/internet protocol (TCP/IP) may also be used as well as satellite communications.

The radio tower 142 may be in communication with an emergency response service, as denoted by block 150, through communication link 144. In addition, the processor 110 may be in communication with a global positioning unit 160. The global positioning unit 160 may be in communication with a satellite 164, as denoted by line 162. The global positioning unit 160 may use information communicated between one or more satellites to determine a location of the mobile device 100. Further, in an emergency situation, the global positioning unit 160 may be in communication with an emergency service provider 150 through the satellite 164, as denoted by line 166.

Accordingly, the sensor 112 may be continuously sensing for effluents and communicating information with the processor 110. The processor 110 may be continuously determining if one or more effluents are detected and also the composition of the one or more effluents. In addition, an accelerometer 146 may be in communication with the processor 110. The processor 110 may poll the sensor 112 based on a sudden change in acceleration seen by the accelerometer 146. As such, the processor 110 will then request the effluent information from the sensor 112 based on the change in acceleration to determine whether the effluents are detected, as well as, the composition of the effluents. The processor 110 may determine if the composition of one or more effluents is above a threshold to communicate with the transceiver 114 to initiate an emergency communication, such as a 911 emergency call to the emergency service provider 150.

In addition, the processor 110 may determine if the composition of one or more of the effluents is below a second lower threshold and prompt the user using the user interface 122 to determine whether an emergency communication should be initiated. The prompting of the user may also include a beeping or noise provided from the speaker 128. If the user does not respond to the prompt within a predetermined time period, the processor 110 may be configured to initiate the emergency communication based on the second lower threshold to contact the emergency service provider 150. The processor 110 may also be in communication with a global positioning unit 160 to receive position information of the mobile device 100. As such, the processor 110 may transmit the position information to the emergency service provider 150 to identify the location of the mobile device 100 and, therefore, the location of the airbag deployment. The processor 110 may also transmit an automated message to the emergency service provider 150 as part of the emergency communication. For example, when only an analog cellular communication link may be established and a 911 emergency call is initiated, the processor 110 may provide a voice message based on the airbag deployment condition that alerts the 911 operator by voice the details of the emergency situation, including the name of the person, that an airbag deployment is thought to have occurred, the fact that the message is an automated message, the location from the GPS unit if available, as well as other pertinent information.

Figure 2:
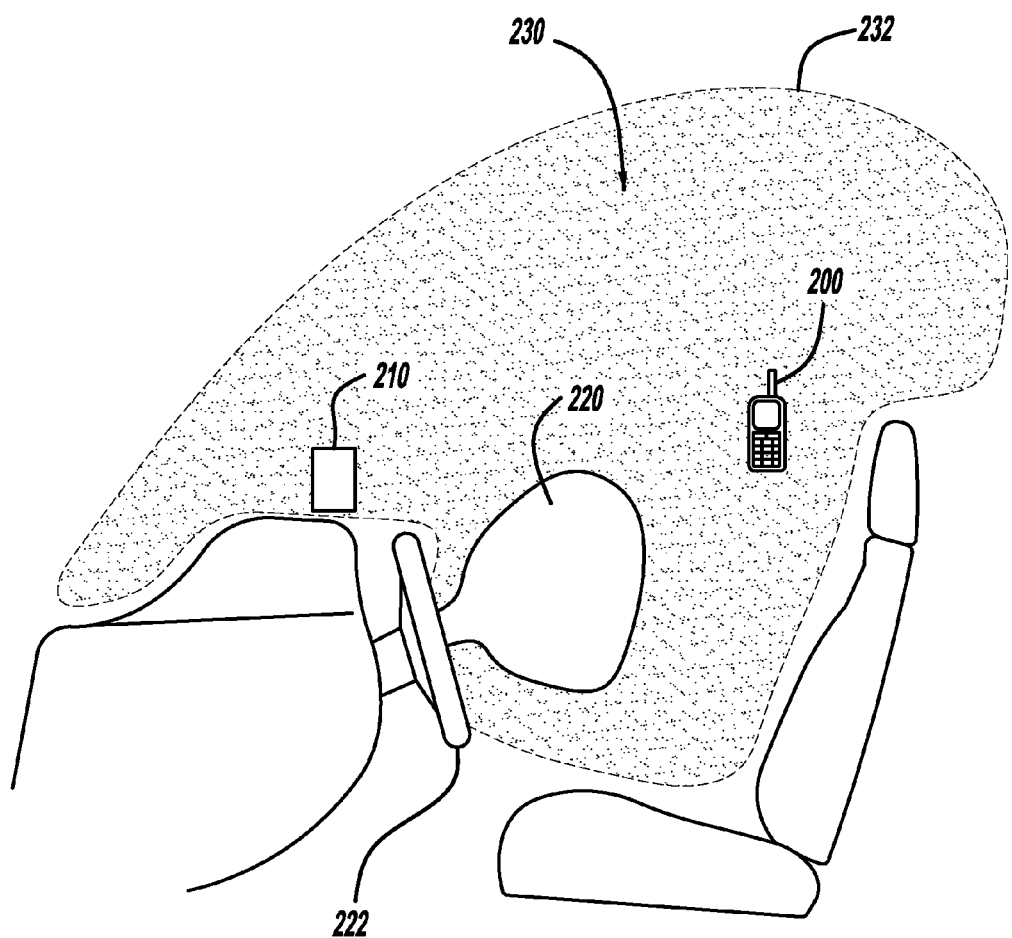
FIG. 2 illustrates the use of the device in a vehicle.

Now referring to FIG. 2, one scenario where the airbag deployment function of the mobile device is illustrated. A mobile phone 200 as well as a GPS unit 210 are provided within a vehicle and may include any one or more of the features described in reference to FIG. 1. The mobile devices 200, 210 are located in front of a vehicle where a driver airbag 220 is being deployed from a steering wheel mount 222. As the airbag 220 is being deployed, effluents 230 are being emitted into the vehicle compartment and will spread across a wide zone 232 of the vehicle compartment. As such, the chemical sensors in the mobile devices 210, 200 may sense the effluents 230 and determine an appropriate action as described above with reference to FIG. 1.

Figure 3:
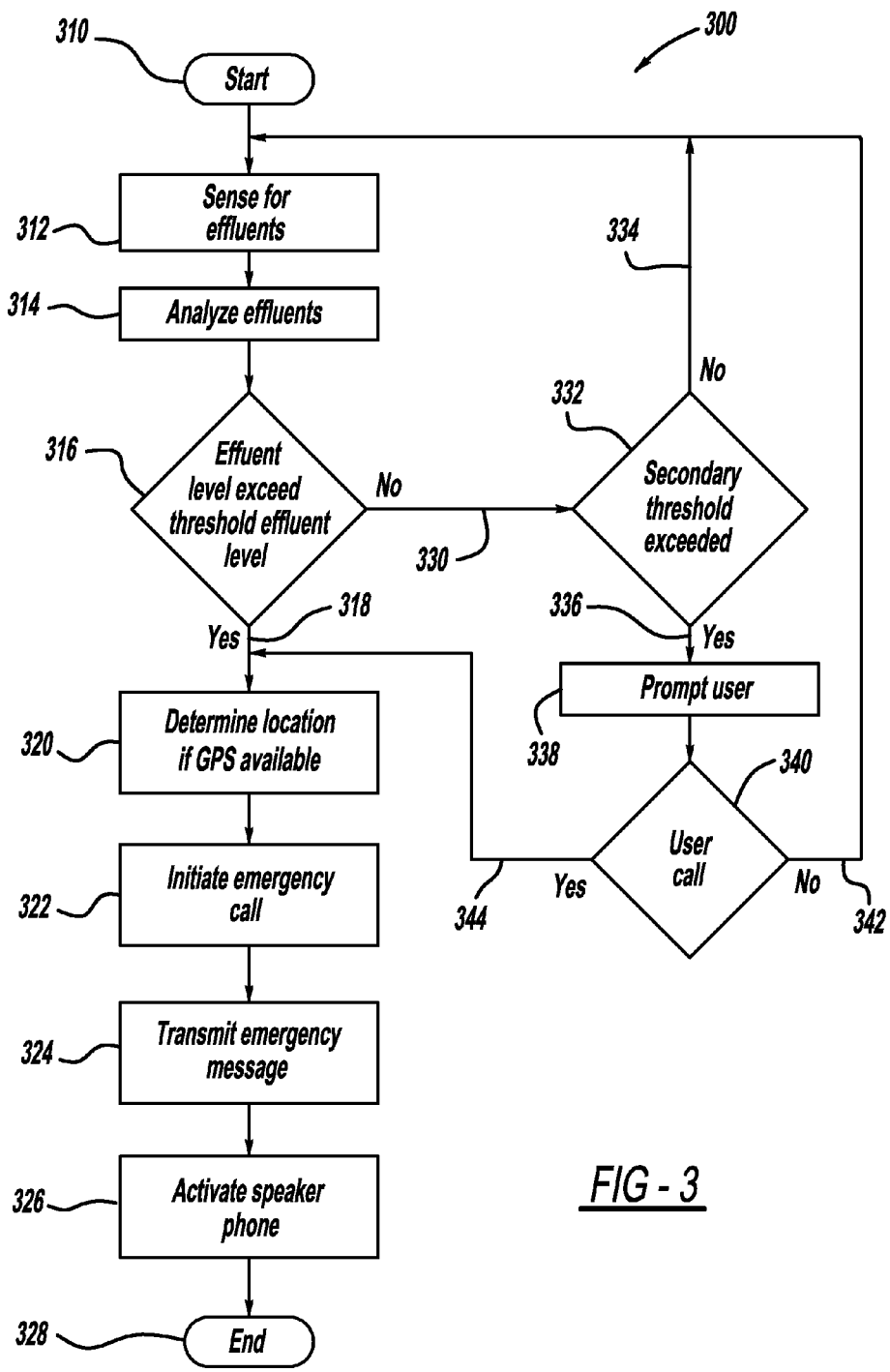
FIG. 3 is a flow chart illustrating a method for sensing airbag deployment with a mobile device.

Now referring to FIG. 3, a flow chart of a method 300 is provided for sensing airbag deployment with a mobile device. The method starts in block 310. In block 312, the mobile device senses for effluents. For example, the mobile device may include an airborne chemical analysis chip in communication with processor to identify one or more effluents indicative of airbag deployment. In block 314, the presence of the effluents is analyzed, for example, the concentration of each of the effluents may be analyzed to determine whether an airbag is deployed. In one example, if any of the effluents are above a threshold level, a determination may be made that an airbag has been deployed. Further, the effluents may be analyzed by sending a weighted score for each effluent and comparing the sum of the weighted scores to a threshold to determine whether the composition of effluents is indicative of airbag deployment.

In block 316, the mobile device determines whether the effluent level has exceeded a threshold effluent level as described above. If the effluent level exceeds a threshold, then the method follows line 318 to block 320. In block 320, the mobile device determines a location of the mobile device if a GPS is available. In block 322, the mobile device initiates an emergency communication such as an emergency 911 phone call. Accordingly, the emergency communication may be initiated based on the threshold of the effluent level, then an emergency message may then be transmitted from the mobile device to an emergency service responder, as denoted by block 324. In block 326, a speaker phone may be activated on the mobile device. For example, if the user is in an airbag deployment condition, the user may not be able to readily access the mobile device, therefore, a speaker phone mode may be enabled. The method then ends in block 328.

Referring again to block 316, if the effluent level does not exceed the first threshold, the method follows line 330 to block 332. In block 332, the effluent level is evaluated with respect to a secondary threshold. The secondary threshold may take the form of any of the previously discussed threshold analyses and may for example, be set at a lower level than the first threshold applied in block 316. If the secondary threshold is not exceeded, the method follows line 334 to block 312 where the method continues. If the secondary threshold is exceeded in block 332, the method follows line 336 to block 338.

In block 338, the user may be prompted through a user interface and/or audible signal to provide an indication of whether emergency communication initiation is desired. In block 340, if the user indicates that emergency call initiation is desired or if the user does not respond to the prompt, then the method follows line 344 to block 320. In block 320, the method determines the location of the GPS signal and the method continues as previously described. However, if in block 340, the user does not desire that an emergency call be initiated or the settings of the mobile device are set to ignore the secondary threshold, then the method follows line 314 to block 312 where the method continues.

In other embodiments, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Further, the methods described herein may be embodied in a computer-readable medium. The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

As a person skilled in the art will readily appreciate, the above description is meant as an illustration of the principles of the invention. This description is not intended to limit the scope or application of the invention in that the invention is susceptible to modification, variation and change, without departing from spirit of the invention, as defined in the following claims.

We claim:

1. A mobile device with airbag deployment sensing, the mobile device comprising:
    a chemical sensor configured to detect an effluent indicative of airbag deployment;
    a processor configured to communicate with the chemical sensor to determine if an airbag deployment condition exists;
    a transmitter configured to initiate an emergency communication; and
    wherein the chemical sensor is at least one of:
        configured to detect at least one effluent from a group of effluents consisting of sodium azide, nitroguanidine, ammonium nitrate ($NH_4NO_3$), dicyanamide or dicyanamide salts, sodium borohydride ($NaBH_4$), sodium hydroxide, cornstarch, French chalk, and talcum powder;
        configured to detect a combination of two or more effluents indicative of airbag deployment;
        configured to, together with the processor, identify the airbag deployment condition based on a weighted combination of a plurality of effluents indicative of airbag deployment: and
        one of a plurality of chemical sensors configured to detect a plurality of effluents indicative of airbag deployment.

2. The mobile device according to claim 1, wherein the chemical sensor and processor are configured to apply a first threshold to identify a concentration of the effluent indicative of airbag deployment and initiate the emergency communication based on the first threshold.

3. The mobile device according to claim 2, wherein the chemical sensor and processor are configured to apply a second threshold to identify the concentration of the effluent indicative of airbag deployment and prompt a user based on the second threshold.

4. The mobile device according to claim 3, wherein the processor is configured to initiate the emergency communication if the prompt is not addressed by the user within a predetermined time period.

5. The mobile device according to claim 1, further comprising a global positioning unit, the processor being configured to retrieve a location from the global positioning unit and transmit the location as part of the emergency communication.

6. The mobile device according to claim 1, wherein the processor is configured to transmit an automated message as part of the emergency communication.

7. The mobile device according to claim 6, wherein the automated message is an automated voice message.

8. A mobile phone with airbag deployment sensing, the mobile phone comprising:
a chemical sensor chip configured to detect an effluent indicative of airbag deployment;
a processor configured to communicate with the chemical sensor chip to determine if an airbag deployment condition exists, the chemical sensor chip and processor being configured to identify the airbag deployment condition based on a weighted combination of a plurality of effluents indicative of airbag deployment, wherein the chemical sensor chip and processor are configured to apply a first threshold to identify a concentration of the effluent indicative of airbag deployment and initiate an emergency communication based on the first threshold, the chemical sensor chip and processor being further configured to apply a second threshold to identify the concentration of the effluent indicative of airbag deployment and prompt a user based on the second threshold, the processor being configured to initiate the emergency communication if the prompt is not addressed by the user within a predetermined time period;
a transmitter configured to initiate the emergency communication.

9. The mobile phone according to claim 8, wherein chemical sensor chip is configured to detect at least one effluent from a group of effluents consisting of sodium azide, nitroguanidine, ammonium nitrate (NH4NO3), dicyanamide or dicyanamide salts, sodium borohydride (NaBH4), sodium hydroxide, cornstarch, French chalk, and talcum powder.

10. The mobile device according to claim 9, further comprising a global positioning unit, the processor being configured to retrieve a location from the global positioning unit and transmit the location as part of the emergency communication.

11. A method for airbag deployment sensing with a mobile device, the method comprising:
sensing an effluent indicative of airbag deployment with a chemical sensor;
determining if an airbag deployment condition exists based on the sensing of the chemical sensor;
initiating an emergency communication if it is determined that the airbag deployment condition exists; and
at least one of:
detecting at least one effluent from a group of effluents consisting of sodium azide, nitroguanidine, ammonium nitrate (NH4NO3), dicyanamide or dicyanamide salts, sodium borohydride (NaBH4), sodium hydroxide, cornstarch, French chalk, and talcum powder;
detecting a combination of two or more effluents indicative of airbag deployment; and
identifying the airbag deployment condition based on a weighted combination of a plurality of effluents indicative of airbag deployment.

12. The method according to claim 11, further comprising applying a first threshold to identify a concentration of the effluent indicative of airbag deployment and initiate the emergency communication based on the first threshold.

13. The method according to claim 12, further comprising applying a second threshold to identify the concentration of the effluent indicative of airbag deployment and prompt a user based on the second threshold.

14. The method according to claim 13, further comprising: initiating the emergency communication if the prompt is not addressed by the user within a predetermined time period.

15. The method according to claim 11, further comprising: retrieving a location from a global positioning unit and transmitting the location as part of the emergency communication.

16. In a computer readable non-transitory storage medium having stored therein instructions executable by a programmed processor for airbag deployment sensing with a mobile device, the storage medium comprising instructions for:
sensing an effluent indicative of airbag deployment with a chemical sensor;
determining if an airbag deployment condition exists based on the sensing of the chemical sensor;
initiating an emergency communication if it is determined that the airbag deployment condition exists; and
at least one of:
detecting at least one effluent from a group of effluents consisting of sodium azide, nitroguanidine, ammonium nitrate (NH4NO3), dicyanamide or dicyanamide salts, sodium borohydride (NaBH4), sodium hydroxide, cornstarch, French chalk, and talcum powder;
detecting a combination of two or more effluents indicative of airbag deployment; and
identifying the airbag deployment condition based on a weighted combination of a plurality of effluents indicative of airbag deployment.

17. The computer readable non-transitory storage medium according to claim 16, having stored therein instructions for: applying a first threshold to identify a concentration of the effluent indicative of airbag deployment and initiate the emergency communication based on the first threshold.

18. The computer readable non-transitory storage medium according to claim 17, having stored therein instructions for: applying a second threshold to identify the concentration of the effluent indicative of airbag deployment and prompt a user based on the second threshold.

19. The computer readable non-transitory storage medium according to claim 18, having stored therein instructions for: initiating the emergency communication if the prompt is not addressed by the user within a predetermined time period.

20. The computer readable non-transitory storage medium according to claim 16, having stored therein instructions for: retrieving a location from a global positioning unit and transmitting the location as part of the emergency communication.

21. The computer readable non-transitory storage medium according to claim 16, having stored therein instructions for: transmitting an automated voice message as part of the emergency communication.

* * * * *